United States Patent
Minhas et al.

(10) Patent No.: US 7,838,814 B2
(45) Date of Patent: Nov. 23, 2010

(54) PLENOPTIC SYSTEM FOR RECORDING IMAGES FROM SHEETS

(75) Inventors: Rajinderjeet Singh Minhas, Churchville, NY (US); Wencheng Wu, Webster, NY (US); Robert P. Herloski, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 648 days.

(21) Appl. No.: 11/805,462

(22) Filed: May 23, 2007

(65) Prior Publication Data

US 2008/0291202 A1 Nov. 27, 2008

(51) Int. Cl.
*H01J 3/14* (2006.01)
*G06T 15/10* (2006.01)
*H04N 9/47* (2006.01)
*H04N 5/235* (2006.01)
*G06K 9/00* (2006.01)

(52) U.S. Cl. .................. 250/216; 345/427; 348/59; 348/222.1; 382/154

(58) Field of Classification Search .............. 250/216, 250/208.1, 237 R, 237 G, 559.29; 359/641, 359/462–466, 472, 477, 725; 345/419, 426–428; 348/42–60, 222.1; 396/324–333; 382/154, 382/276, 277
See application file for complete search history.

(56) References Cited

U.S. PATENT DOCUMENTS

| | | | |
|---|---|---|---|
| 3,954,334 A * | 5/1976 | Bestenreiner et al. .......... 355/52 |
| 4,816,939 A * | 3/1989 | Ford et al. ............... 360/77.03 |
| 5,076,687 A | 12/1991 | Adelson |
| 5,521,695 A | 5/1996 | Cathey, Jr. et al. |
| 6,763,141 B2 | 7/2004 | Xu et al. |
| 6,969,003 B2 | 11/2005 | Havens et al. |
| 7,038,184 B2 | 5/2006 | Chang |
| 7,170,644 B2 | 1/2007 | Loce et al. |

OTHER PUBLICATIONS

Ng and Hanrahan, "Digital Correction of Lens Aberrations in Light Field Photography," *Optical Design Conference 2006*, SPIE vol. 6342.

"Plenoptic Camera" by John Y. A. Wang, pp. 1-5; http://www=bcs.mit.edu/people/jyawant/demos/plenoptic/plenoptic.html.

Ren Ng, Fourier Slice Photography, Stanford University, ACM Transactions on Graphics, Jul. 2005, Proceedings of Siggraph.

Ren Ng et al., Light Field Photography with a Hand-held Plenoptic Camera, Stanford Tech Report CTSR 2005-02, Apr. 2005.

* cited by examiner

*Primary Examiner*—Kevin Pyo
*Assistant Examiner*—Don Williams
(74) *Attorney, Agent, or Firm*—Pillsbury Winthrop Shaw Pittman LLP

(57) ABSTRACT

A system for recording an image as digital data comprises a photosensor array and a plenoptic set, including a main lens and a lenticular grating, to enable the photosensor array to obtain plenoptic image data from the sheet. A subset of the plenoptic image data is selected, such as according to a predetermined object distance, to obtain image data for a focused image. The subset of the plenoptic image can be selected after the scanning, so that prescanning of an unusual-shaped image-bearing object, such as an open book, is avoided.

12 Claims, 4 Drawing Sheets

US 7,838,814 B2

PLENOPTIC SYSTEM FOR RECORDING IMAGES FROM SHEETS

INCORPORATION BY REFERENCE

The following U.S. patents are hereby incorporated by reference, each in its entirety, for the teachings therein: U.S. Pat. Nos. 5,076,687; 6,763,141; 7,038,184; and 7,170,644.

TECHNICAL FIELD

The present disclosure relates to scanning systems for recording original images on sheets, such as would be used in office-equipment and printing contexts.

BACKGROUND

In recent years a technology known as "plenoptics" has started to become realizable. In plenoptics, a special set of optical elements is employed to collect and record image data (of an object) that can be processed to emulate three-dimensional images, from various angles, of the object. The typical set of optical elements for recording plenoptic images includes, a main lens, which can effectively be a simple round lens, a lenticular grating, and a recording device, having pixel sized photosensitive photosensors arranged so that multiple pixel areas correspond to different locations within each lenticule. Image data from particular subsets of photosensors is selected, and the image data from the subsets is suitably processed; in this way, images corresponding different to viewing angles relative to an object can be obtained, substantially without ever moving the elements relative to the object. Some documents describing the rudiments of plenoptic image recording include U.S. Pat. Nos. 5,076,687 and 7,038,184.

A challenge in the art of office equipment is the accurate digital recording (such as for copying or scanning) of original images from bound books or other odd-shaped originals, such as packages. Ideally, an image-bearing sheet should be in full contact with a platen, so that all portions of the sheet can be predictably focused upon. With an open, bound book, however, very often the portion of any page near the binding will not be in contact with the platen, and will thus be out of focus with regard to the optical elements in the copier or scanner, resulting in a distorted, improperly illuminated, and unfocused portion of the image. Many approaches have been tried to overcome this difficulty, including applying special calculations to the recorded digital data (which may require multiple scans of the original image), as shown in U.S. Pat. Nos. 6,763,141 and 7,170,644.

A challenge in the art of printing equipment is the accurate digital recording (such as for copying or scanning) of original images on sheets moving at high speed through a baffle. At high speeds the sheet is often not urged against one side of the baffle, such as a side having a window therein. Thus, a photosensor array recording images on the sheets may not be able to focus on a predictable zone within the baffle.

U.S. Pat. Nos. 5,521,695 and 6,969,003, and the article by Ng and Hanrahan, "Digital Correction of Lens Aberrations in Light Field Photography," Optical Design Conference 2006, SPIE Vol. 6342, each describe techniques, using approaches similar to those used in plenoptics, to improve the depth of field and other optical qualities of lens systems.

SUMMARY

According to one aspect, there is provided a system for recording an image as digital data, comprising a photosensor array; a plenoptic set, including a main lens and a lenticular grating, the plenoptic set being disposed to convey light from the image to the photosensor array, to enable the photosensor array to obtain plenoptic image data from the sheet; and means for selecting, from a set of plenoptic image data associated with an image, a subset of the plenoptic image data and an algorithm for combining the selected subset of image data to obtain image data for a focused image.

DETAILED DESCRIPTION

Figure 1:
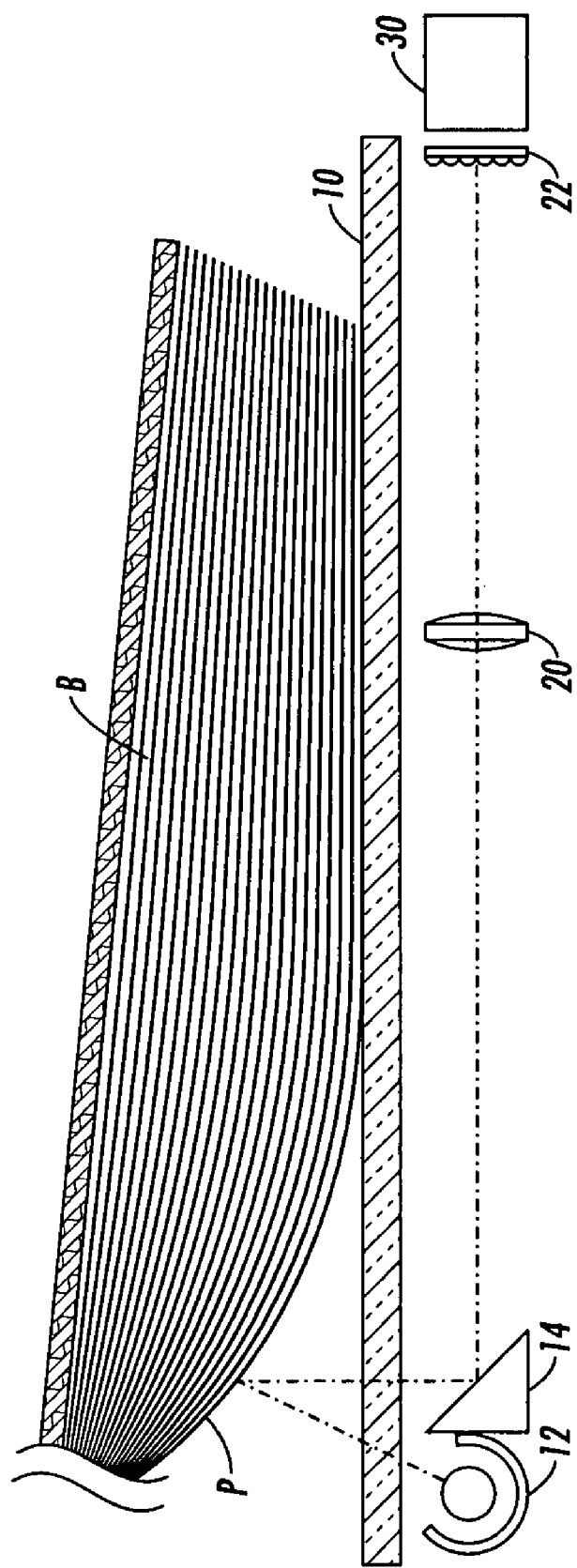
FIG. 1 is a simplified elevational view of a platen and associated optics and image-processing system, as would be found in a digital scanner or copier, scanning an image from a page of an open book.

FIG. 1 is a simplified elevational view of a platen and associated optics and image-processing system, as would be found in a digital scanner or copier, scanning an image from a page P of an open book B. The open book is supported on a platen 10; light emitted from a lamp 12 passes through platen 10 and is reflected by the surface of page P. The light reflected from page P, which embodies image data to be recorded, passes again through platen 10, is reflected by mirror 14, and then passes through a main lens 20 and lenticular grating 22, details of which will be described below. The light is then recorded as digital signals by photosensors in photosensor array 30. In a typical scanner or digital copier, the lamp 12, mirror 14 and main lens 20 are mounted on a mechanical arrangement (not shown) that will cause a desired focus to be maintained as the elements move relative to the platen 10 to record the entire page image.

As can be seen in the Figure, in the case of the open book B, a portion of the page P near the book binding is not in contact with the top surface of platen 10. As such, in a basic case, maintaining focus and illumination on the non-contacting portion of page P is a challenge if a "flat" image, with uniform illumination and focus, is desired.

Figure 2:
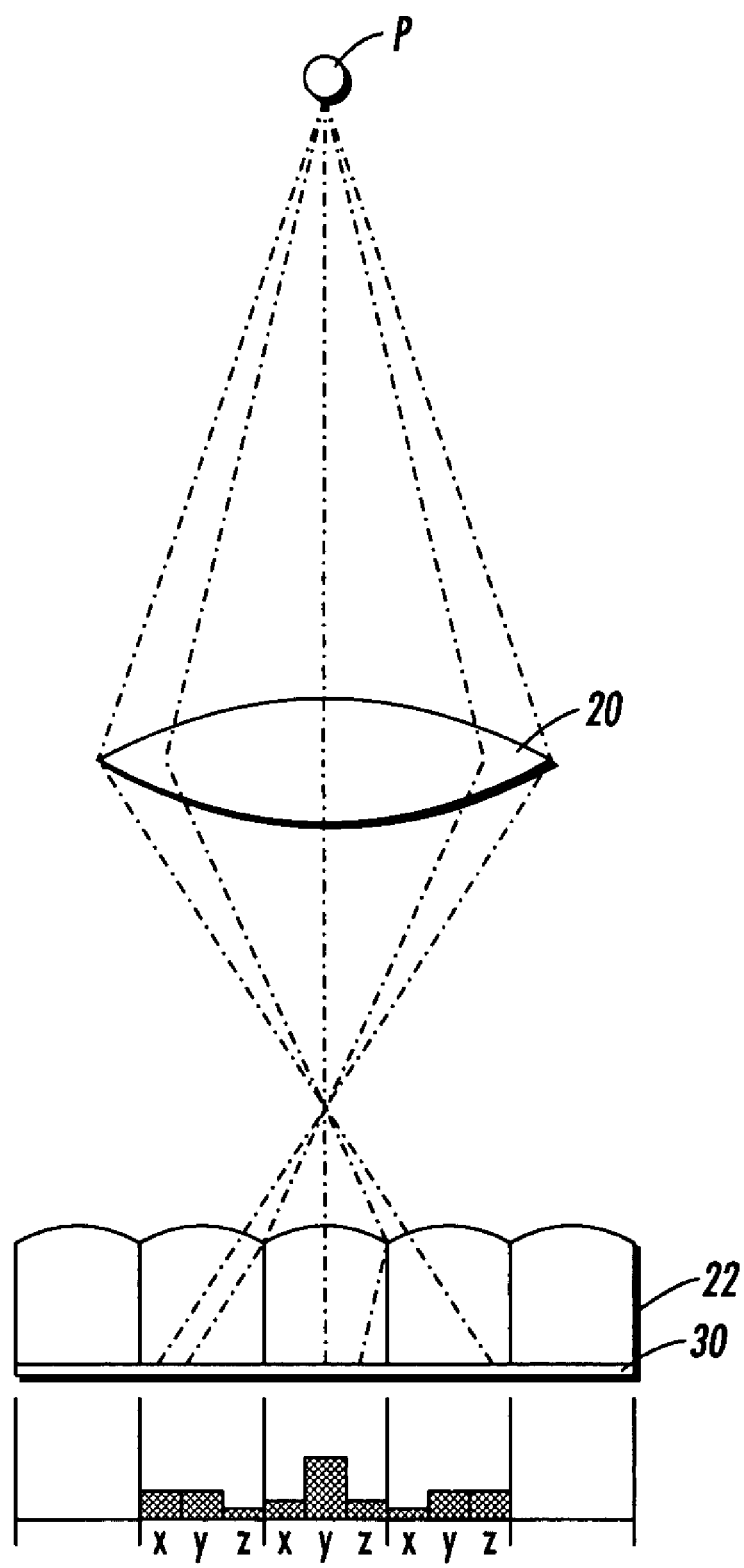
FIG. 2 is an adaptation of FIG. 3B from U.S. Pat. No. 5,076,687, with the reference numbers adapted to be consistent with FIG. 1 of the present application.

FIG. 2 is an adaptation of FIG. 3B from U.S. Pat. No. 5,076,687, with the reference numbers adapted to be consistent with FIG. 1 of the present application. For a particular target location P such as on a book B shown in FIG. 1, the simple lens 20 focuses reflected light onto lenticular grating 22. Each lenticule in grating 22 is associated, in this case, with three photosensors, here indicated as x, y, z for each lenticule. Because of the refractive properties of each lenticule, each of the three photosensors associated with each lenticule will respond with different signal magnitudes depending on the exact distance to P and location of lens 20: as used herein, all of the data associated with all of the lenticules of interest will be called the "plenoptic" image data. In various possible embodiments, the lenticules in the grating 22 are typically substantially cylindrical, with a horizontal or vertical orientation in the view of FIG. 1, although other "gratings," such as using fly's-eye optics, are possible. Any combination of optical elements helpful in obtaining plenoptic image data, such as a simple lens and a grating of any kind, can be called a "plenoptic set."

As described in detail in the '687 patent (especially with regard to FIGS. 6A and 6B thereof), by selecting a weighted set of signal values from different photosensors associated with each lenticule, a "correct" object distance to a target such as P can be calculated; further, with the correct object distance, a subset of the plenoptic image data (the term "subset" including any weighted selection of signals of any or all photosensors of interest) can be used to obtain a focused image from the plenoptic data. In brief, a set of plenoptic data is taken from all the photosensors associated with all the lenticules of interest; by selecting a subset of the plenoptic data and processing it accordingly, image data consistent with a focused image can be obtained after the image data is recorded.

Figure 3:
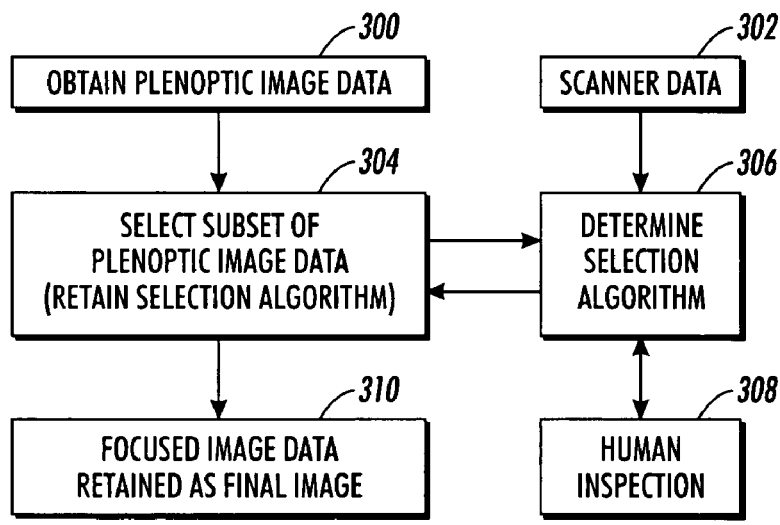
FIG. 3 is a flowchart of the operation of a scanner that records plenoptic image data and derives therefrom focused image data suitable for recording.

FIG. 3 is a flowchart of the operation of a scanner that records plenoptic image data and derives therefrom focused image data suitable for recording. The flowchart of FIG. 3 can be adapted for processing of entire page images, or can be adapted to operate in real time as, for example, the mirror 14 of FIG. 1 or equivalent structure moves relative to platen 10 as a single hard-copy image is recorded. When operating on individual scanlines being recorded as mirror 14 moves relative to the platen 10, each location P as shown in FIG. 2 will correspond to a line being viewed by photosensor array 30 via mirror 14 at a given time.

At step 300 in FIG. 3, the plenoptic image data is obtained from photosensor array 30. The photosensor array 30, as shown in FIG. 1, includes a plurality of photosensors associated with each of a plurality of lenticules in a lenticular grating 22. The plenoptic image data from photosensor array 30 (whether as a full page image or just one scanline) in raw form will include signals from every photosensor associated with every lenticule in the grating 22. As will be described in detail below, and in further detail in the patents incorporated by reference above, the raw data will eventually be subjected to a selection process in which weighted values of the raw signals are selected to contribute to a set of image data to be recorded.

In this embodiment, simultaneous with the recording of plenoptic data, a recording is made of the effective position of the scanning array (in the FIG. 1 embodiment, the exact position of mirror 14) when a particular scanline of the image is being recorded, as shown at step 302. As can be seen in FIG. 1, as mirror 14 moves relative to platen 10, different portions of the book will be "looked at" through time; and, in the illustrated example, the portions of page P not in contact with the platen 10 will present different focal distances, illumination, and angles relative to mirror 14 and photosensor array 30: these changes in focal distances, illumination, and angles will affect the selection of data from the plenoptic data, as will be described in detail below.

Once the plenoptic image data is obtained, the data (either one scanline at a time, or as a file for an entire page image) is subject to a selection algorithm, that takes into account a determined focal distance to one or more locations P, and, in turn, selects a subset of the plenoptic data consistent with a focused image, as shown at step 304.

The precise nature of the selection algorithm, shown at step 306, for obtaining a focused image from a particular scanline or portion of an image associated with a given location P can be informed by various inputs. One possible input is the position of mirror 14 or equivalent structure relative to the platen 10 at the time of obtaining the plenoptic data for a given scanline. The relationship between a given position of mirror 14, such as shown at 302, and the position, illumination, and angle of a particular target P can, in some instances, be described as a continuous function, particularly in the case of the book scanning example shown in FIG. 1. A system can derive data from previous scans of the same book as a starting point for determining the curvature of a book or other object for a current scan: an initial estimation of the curvature is used first to locate the exact location of a target P for a particular position of mirror 14, and then used to influence the selection of plenoptic data for a desired final image.

Figure 4:
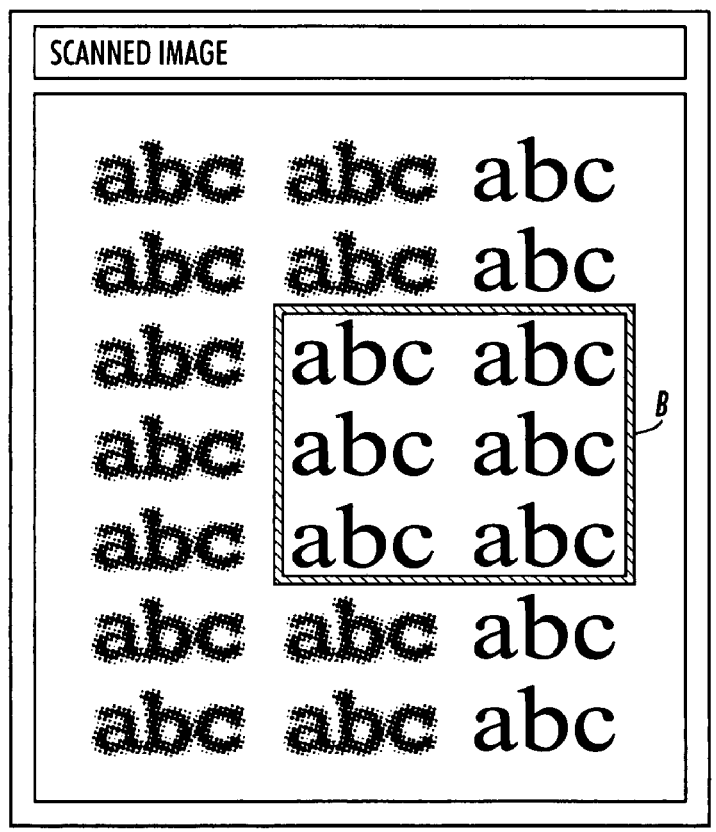
FIG. 4 shows an example "window," as would appear on a computer screen, pursuant to an operation in FIG. 3.

Another source of input data influencing the selection of a subset of plenoptic-data can be human judgment, as shown as 308 in FIG. 3. There can be provided, either associated with an input scanner, or in an offline environment, a user interface in which plenoptic data associated with a scanned image can be viewed and manipulated. An example "window," as would appear on a computer screen, is shown in FIG. 4. A graphical utility allows a portion of the scanned image data to be isolated within a boundary B, as shown; and within boundary B, a user can, via software, manipulate a selection of plenoptic data associated with the image within boundary B to be consistent with various possible object distances to the target P. In other words, a user in effect "turns a knob" to sample and view subsets of plenoptic data consistent with different object distances: when the virtual object distance, manifest in a particular selection algorithm of the plenoptic data, is consistent with the actual object distance of the small area when the image was originally plenoptically scanned, the resulting subset of selected data will appear to be in focus. Further, once one bounded area such as B of the image is thus "focused," the selection algorithm used to obtain the focused image can influence the selection algorithm for areas neighboring the bounded area, particularly if it can be assumed that the surface of interest is substantially continuously curved.

Human judgment can be applied in a similar way with respect to illumination: a user can isolate an area in boundary B and in effect turn a knob to alter image brightness or contrast to a desired level, or to be consistent with neighboring areas in the image.

Instead of relying on human input to determine whether a particular set of plenoptic data is consistent with a focused image, some techniques generally known from the art of image processing can be applied to the plenoptic data to determine whether a certain subset of the plenoptic data is consistent with a focused image. In the case of a text image, for example, algorithms are known to determine "sharp" changes in contrast as would be found in sharply-focused edges of characters. Such an algorithm could be applied to each of a series of subsets of plenoptic data, such as consistent with different object distances, until a "best focus" subset of data is identified.

Figure 5:
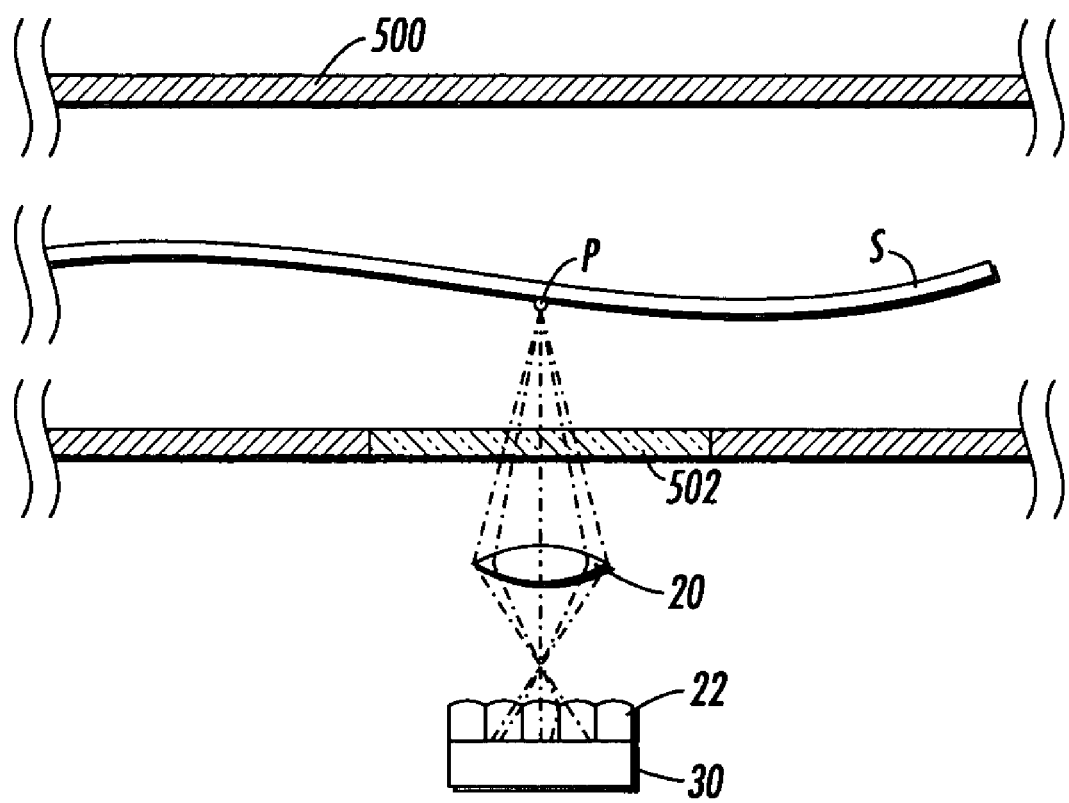
FIG. 5 is a simple diagram showing another application of a plenoptic-based system.

FIG. 5 is a simple diagram showing another application of the plenoptic-based system described above, in the context of recording images on sheets that are moving through a baffle at high speed. When a sheet such as S moves through a baffle 500 as shown, the surface of the sheet cannot be pressed neatly against a platen or window 502 on the side of the baffle, but rather "floats" within the baffle so that focusing on the surface of the sheet is difficult. As shown herein, the optics (analogous to the similarly-numbered elements described above) can gather plenoptic data in a "snapshot" from the moving sheet, and then the focused image can be obtained from the plenoptic data at a later time, using most of the techniques shown in FIG. 3 above. The principle shown in FIG. 4 can be applied to recording an image on the surface of a belt, such as a photoreceptor belt used in xerography or an intermediate belt used in various forms of printing, which is moving at high speed and is thus vibrating or otherwise moving in an unpredictable way.

A practical advantage of the above-described system in the context of office equipment is that only one scanning operation is required: all of the selection of the correct subset of plenoptic data for obtaining a focused image takes place after the plenoptic data is collected in effectively one scan. Various prior art systems tend to require a "prescan" of an image-bearing object, such as an open book, so that the system can "learn" the contours of the image-bearing surface. With the present system, once the plenoptic image data is initially recorded, it can be stored indefinitely until it is desired to obtain a focused or-better-focused image, by selection of the best subset of the plenoptic image data.

Although the illustrations and description relate to a monochrome scanning system, the teachings herein can readily be applied to a color system, wherein separate sets of photosensors such as 30 are respectively dedicated to recording different color separations.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A system for recording an image on a sheet as digital data, comprising:
   a photosensor array comprising a plurality of photosensors, the photosensor array configured to receive light reflected from the sheet and to output image data as digital signals during a scanning operation;
   a plenoptic set, including a main lens and a lenticular grating, the plenoptic set being disposed to convey light from the sheet to the photosensor array, to enable the photosensor array to obtain the image data from the sheet during the scanning operation as plenoptic image data; and
   an image processing system configured to select, from a set of plenoptic image data associated with an image, a subset of the plenoptic image data based on an algorithm to obtain image data for a focused image,
   wherein the set of the plenoptic image data has different object distances, the selected subset of the plenoptic image data has a predetermined focus, and the image processing system is configured to select the subset of the plenoptic image data after the scanning operation is performed.

2. The system of claim 1, the lenticular grating including a plurality of lenticules, each lenticule corresponding to the plurality of photosensors in the photosensor array.

3. The system of claim 2, each lenticule comprising a substantially cylindrical lens.

4. The system of claim 1, further comprising a platen for supporting an item bearing an image to be recorded.

5. The system of claim 4, further comprising a mirror for directing light reflected from the image toward the photosensor array, the mirror being movable relative to the platen to direct light corresponding to a scanline toward the photosensor array.

6. The system of claim 5, the main lens being interposed between the mirror and the photosensor array.

7. The system of claim 1, further comprising a baffle for conveying a moving sheet bearing the image, and wherein the plenoptic set receives light reflected from the moving sheet.

8. The system of claim 1, the algorithm including as an input data relating to an effective position of the photosensor array relative to a location on the sheet.

9. The system of claim 1, the algorithm including as an input data derived from a human inspection of a subset of the plenoptic image data.

10. The system of claim 1, wherein the image processing system is configured to display images consistent with each of a plurality of selected subsets of plenoptic image data, each subset being consistent with a predetermined object distance.

11. The system of claim 1, wherein the image processing system is configured to select one of a plurality of selected subsets of plenoptic image data, each subset being consistent with a predetermined object distance.

12. The system of claim 11, wherein the one of a plurality of selected subsets of plenoptic image data is selected by applying an algorithm for determining an extent a subset of plenoptic image data is consistent with a focused image.

* * * * *